(12) United States Patent
Naaman et al.

(10) Patent No.: US 7,992,197 B2
(45) Date of Patent: Aug. 2, 2011

(54) MOBILE AUTHENTICATION FRAMEWORK

(75) Inventors: Mor Naaman, San Francisco, CA (US); Simon P. King, Berkeley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 943 days.

(21) Appl. No.: 11/926,490

(22) Filed: Oct. 29, 2007

(65) Prior Publication Data

US 2009/0113527 A1    Apr. 30, 2009

(51) Int. Cl.
*H04L 29/06* (2006.01)
(52) U.S. Cl. .......................................... 726/8
(58) Field of Classification Search ................ 726/8
See application file for complete search history.

(56) References Cited

U.S. PATENT DOCUMENTS 4,958,368 A * 9/1990 Parker ...................... 379/91.01
5,237,612 A * 8/1993 Raith .......................... 380/247

OTHER PUBLICATIONS

OAuth Core 1.0, http://oauth.net/core/1.0, printed Feb. 4, 2009 (14 pages).

* cited by examiner

*Primary Examiner* — Jacob Lipman
(74) *Attorney, Agent, or Firm* — Weaver Austin Villeneuve & Sampson LLP

(57) ABSTRACT

Disclosed are apparatus and methods for associating a mobile device with a web service or a user account. A unique code is displayed on the mobile device. The unique code is associated with a user account or web service to be utilized with the mobile device. Instructions for a user to enter the unique code in an authentication process via an authentication portal of a management device are also displayed. After it is determined that a user has performed the authentication process, any user identification, which has been associated with the unique code, is then obtained from the management device. The obtained user identification is then stored for use by the mobile device. After user identification has been obtained and stored, the stored user identification is used for the mobile device to participate in an authentication process for authorizing the mobile device to utilize a web service or user account associated with the user identification. The authentication process is participated in by the mobile device without requiring input from the user during such authentication process.

24 Claims, 6 Drawing Sheets

MOBILE AUTHENTICATION FRAMEWORK

BACKGROUND OF THE INVENTION

The field of the present invention relates generally to mobile device applications. More particularly, it relates to use of credentials or other user information with such mobile applications.

The use of mobile applications on mobile devices, such as cellular phones or personal digital assistant (PDA) device, has increased dramatically in the last few years. A user may utilize any number and type of mobile application on his mobile device. Examples of mobile applications may include search engines, calendar applications, media organization applications, email, chat and messaging applications, etc. Several applications may be provided by a single service entity, such as Yahoo!, Inc.

Each application or set of applications may require specific user credentials prior to allowing a user to utilize such application or set of applications. For instance, one may login to their Yahoo! account and then gain access to various Yahoo! applications, such as email, messaging or chat applications, etc. Although one may enter user credentials via her mobile device to access various applications, the process of entering credentials on a mobile device can be difficult and cumbersome, given the typical mobile device's limited input mechanisms. Other types of devices (e.g., non-mobile devices, televisions, display devices that do not include keyboards, etc.) may also have a limited input mechanism for entering user credentials or gaining access to other types of web services or a user account. Additionally, a user may not wish to enter confidential credentials via his mobile device's mobile application since the user may not trust the particular mobile device's application. For instance, the user may be uncomfortable with not knowing exactly what the mobile application will do with her user credentials.

Accordingly, improved mechanisms for facilitating a device to access a web service or user account are needed.

SUMMARY OF THE INVENTION

In one embodiment, a method of associating a mobile device with a web service or a user account is disclosed. A unique code is displayed on the mobile device. The unique code is associated with a user account or web service to be utilized with the mobile device. Instructions for a user to enter the unique code in an authentication process via an authentication portal of a management device are also displayed. After it is determined that a user has performed the authentication process, any user identification, which has been associated with the unique code, is then obtained from the management device. The obtained user identification is then stored for use by the mobile device. After user identification has been obtained and stored, the stored user identification is used for the mobile device to participate in an authentication process for authorizing the mobile device to utilize a web service or user account associated with the user identification. The authentication process is participated in by the mobile device without requiring input from the user during such authentication process.

In a specific implementation, the unique code is obtained based on an identity associated with the mobile device. In another aspect, the authentication process, in which the mobile device participates, results in the mobile device being authorized to access a session of a web service so that such session is displayed on the mobile device. In yet another embodiment, the code is associated with a timestamp for the user identification to expire. In a further aspect of this embodiment, after the user identification expires based on the timestamp, the operations for displaying a unique code, obtaining and storing user identification, and using the stored user identification are repeated. In an alternative embodiment, the stored user identification includes one or more security settings, wherein the security settings indicate an access level or time to expire for the user identification or a web service or user account associated with such user identification.

In an alternative implementation, a method of performing an authentication process for a mobile device is disclosed. During an authentication process for one or more applications, user identification that authorizes a particular user to access the one or more applications is received. A first unique code associated with the user identification is also received. The first unique code and the user identification are mapped and this mapping is stored. When a request for user identification based on a second unique code is received from a mobile device, the user identification that has been mapped to the first unique code to the mobile device is sent to the requesting mobile device if the first unique code matches the second unique code.

In one aspect, during the authentication process, selectable options that correspond to specific applications are presented. Selections of one or more options are received, and the user identification is only received for the selected specific applications. User identification is then received only for the selected specific applications. In another embodiment, one or more security setting selections are received during the authentication process, and the one or more security setting selections are sent with the user identification to the requester. In a further aspect, the security setting selections indicate an access level or time to expire for the user identification or a web service or user account associated with such user identification. In another feature, the code is received from the mobile device, and the received code includes one or more application identities for one or more specific applications. In this case, the user identification is only received for the one or more specific applications.

In another embodiment, the invention pertains to an apparatus having a processor and a memory that is configured to perform one or more of the above described operations. In another embodiment, the invention pertains to at least one computer readable storage medium having computer program instructions stored thereon that are arranged to perform one or more of the above described operations.

These and other features will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general, embodiments of the present invention provide a mechanism for a mobile device to be associated with a web service or user account (e.g., via user credentials) without the user having to enter the credentials or identification on the mobile device itself. In one implementation, the user can use another device, such as a laptop or desktop computer, to perform an authentication process that results in the user's credentials (or user identification) being sent to the user's mobile device for use in one or more mobile applications. In brief, a mobile application on the user's mobile device may initially display a unique code on the user's mobile device and instruct the user to perform the authentication process, during which the user enters the associated unique code along with user credentials or other type of user identification, for example, via another device. After the authentication process, a mobile application on the mobile device can then obtain user credentials or identification based on the previously displayed unique code. The obtained credentials or identification can then be automatically used by one or more mobile applications of the user's mobile device whenever needed for an authentication process (e.g. for web service or user account access) without the user having to type or input anything into the mobile device during the authentication process.

Figure 1:
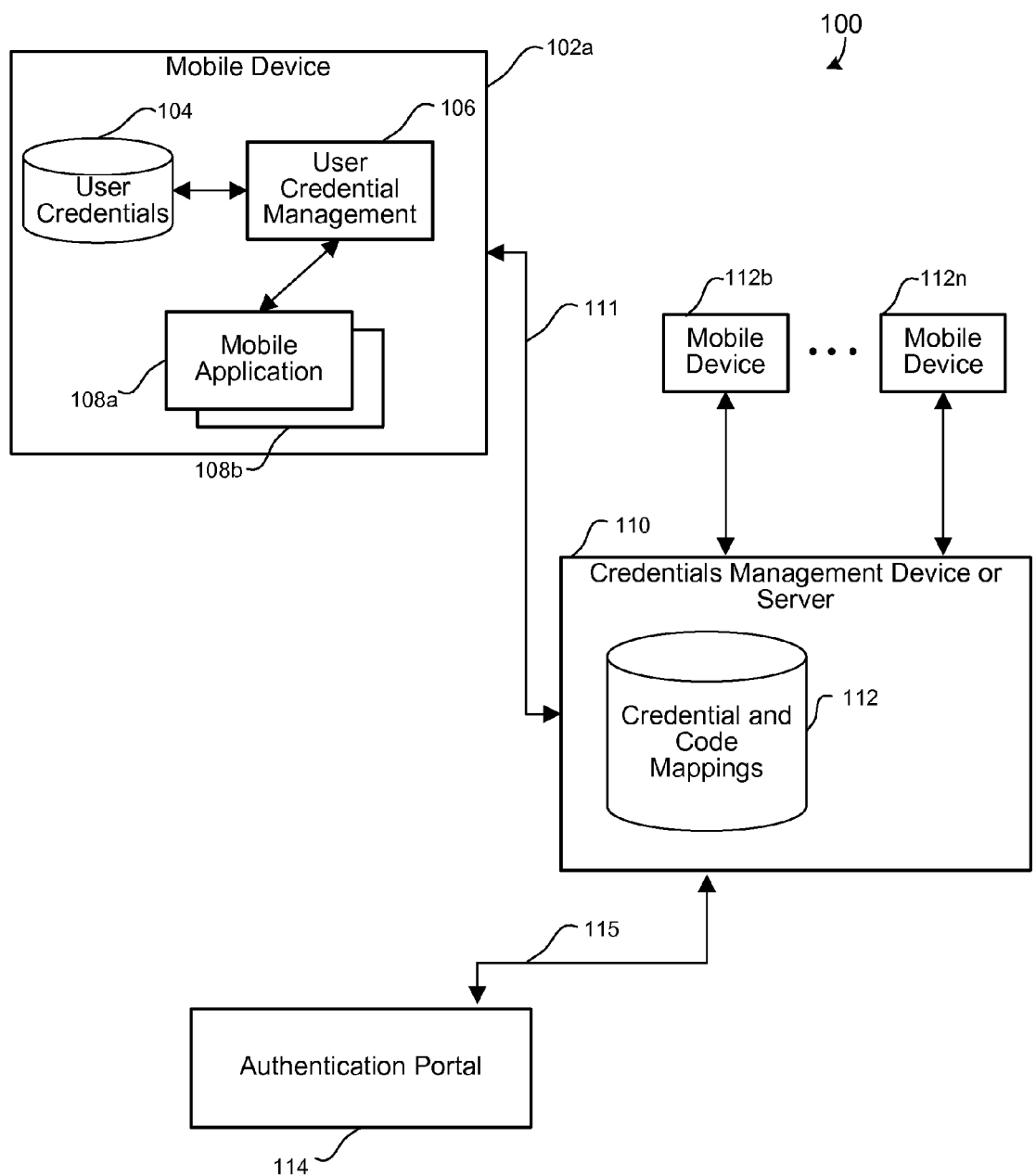
FIG. 1 is a diagrammatic representation of a credential management system for implementing various techniques and embodiments of the present invention.

FIG. 1 is a diagrammatic representation of a credential management system 100 for implementing various techniques and embodiments of the present invention. As shown, the management system 100 includes a plurality of mobile devices 102 for executing one or more mobile applications, a credentials management device or server 110 for managing credentials or identification for use with such mobile applications, and an authentication portal 114 for a user to enter user credentials or identification via a different device, such as a laptop or desktop computer (not shown). The connection lines, e.g., communication path 111 and 115, between the different devices of network 100 represent wireless and/or hardwired communication mechanisms. Some or all of the functionality of the components of network 100 may be integrated together or implemented separately on different software and/or hardware. Additionally, embodiments of the present invention may be implemented for any suitable type of device, besides a mobile device, that is to be associated with a web service or user account. Example devices (e.g., televisions, display devices that do not include keyboards, etc.) may have limited input capability.

An expanded view is illustrated for mobile device 102a. As shown, mobile device 102a may include access to a plurality of mobile applications 108, e.g., via a web browser. Although only two mobile applications 108a and 108b are illustrated, of course, the mobile device 102a may include any number and type of mobile applications. That is, the techniques of the present invention may be applied with any type and number of mobile applications that can utilize some form of user credentials or identification, e.g., for accessing an external web service or user account, in their operation. By way of examples, mobile applications that are accessible to a mobile device may include an email application, a map or navigation application, a photo application, a personal web page application, a blog page, a chat or instant messaging application, local guides, personal news sources, personalized sports news, personalized financial news and updates, personalized entertainment news, personalized local weather updates, personalized search application, etc. Some examples of these applications are available, for example, from Yahoo! of Sunnyvale, Calif.

Mobile device 102a may also include a user credential management module 106 although this module 106 may be integrated within each mobile application 108. Using a unique code for the user, the credential management module obtains user credentials for the mobile device from credentials management server 110 after the user has entered such user credentials and the unique code via authentication portal 114 as described further below. The obtained user credentials may be stored within user credentials database 104. The user credentials database 104 may be in the form of one or more databases that are located internal or external to the mobile device 102a.

The credentials management server 110 may operate to receive user credentials (or user identification) and a unique code from a user via authentication portal 114. The credentials management server 110 may also store a mapping between such received user credentials and unique code in credential and code mappings database 112. The credential and code mappings database 112 may be in the form of one or more databases that are located internal or external to the credentials management server 110.

Figure 2:
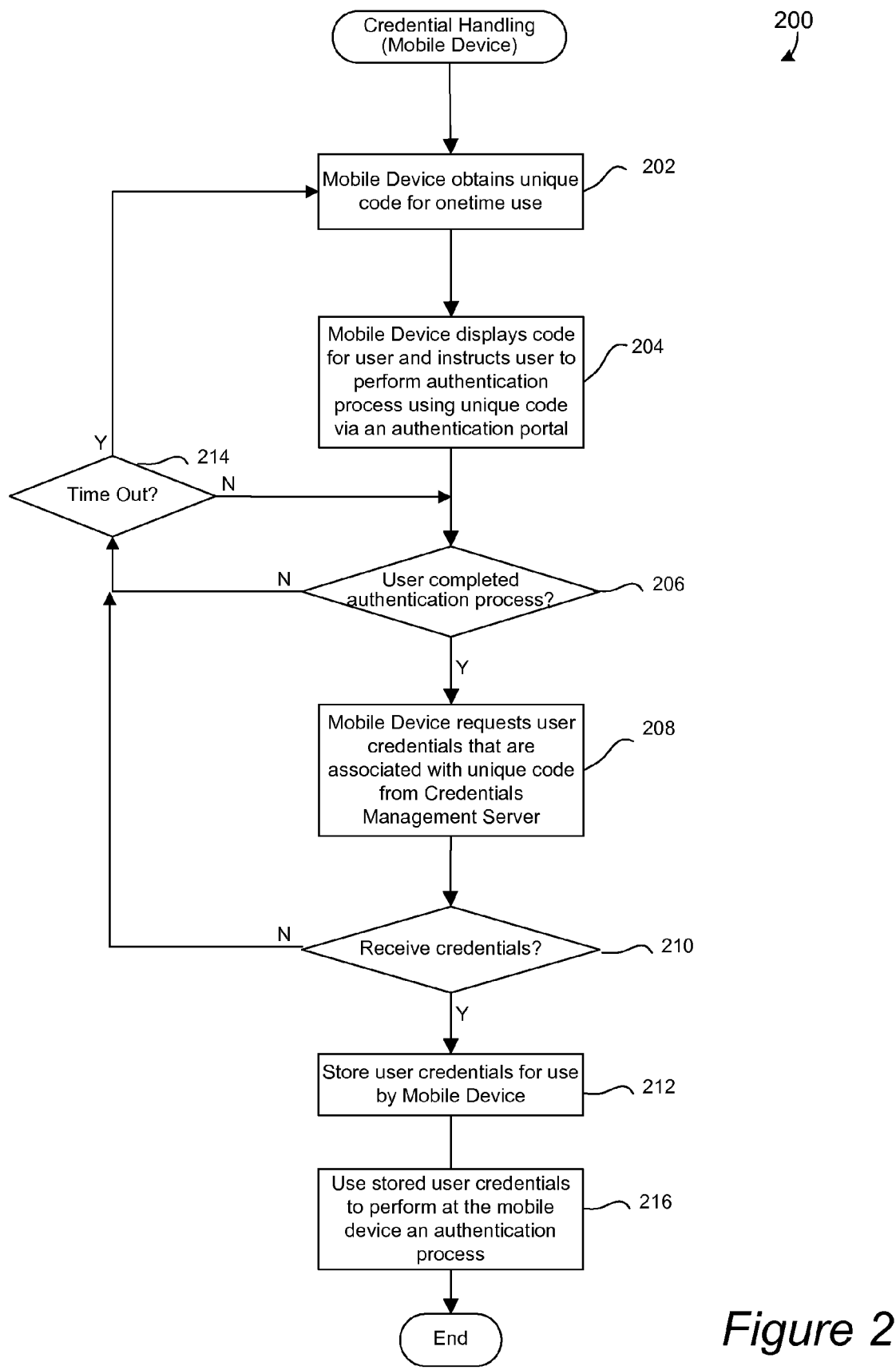
FIG. 2 is a flowchart illustrating a procedure for handling user credentials at a mobile device in accordance with one embodiment of the present invention.

The mobile device may be configured with any suitable techniques for obtaining user credentials (or other user identification information) without the user having to enter the credentials on the mobile device itself. FIG. 2 is a flowchart illustrating a procedure 200 for handling user credentials at a mobile device in accordance with one embodiment of the present invention. Initially, the mobile device (e.g., 102a) obtains a unique code for a one time use in operation 202. This code is unique for its lifetime of use, e.g., while it is being mapped to a particular set of user credentials. The unique code may include any suitable combination of numbers, letters, alphanumerics, or symbols. Any suitable technique may be utilized to provide a unique code. For instance, the unique code may correspond to an identity of the mobile device, such as a hardware characteristic. By way of examples, any portion or all of the unique code may correspond to one or more of the following mobile device identities: a media access control (MAC) address, an International Mobile Equipment Identity (IMEI) number, a telephone number, an IP Address, or other hardware-based serial numbers, etc.

In a specific implementation, a mobile device application could obtain the unique code from a user credentials server, e.g., server 110, via a code request or a unique code could be pushed from the user credentials server to each mobile device.

The user credentials server may generate a unique code based on an identity of the mobile device, which is obtained from the mobile device. Alternatively, the user credentials server may randomly generate a unique code or utilize some combination of random code and an identity of a specific mobile device to form a unique code for such mobile device. In this embodiment, the user credentials server also manages the uniqueness of each code for each of a plurality of mobile devices, e.g., mobile devices 102.

In alternative embodiments, the unique code may also include one or more application identities for specifying mobile applications for which user credentials will be obtained as described further herein. For instance, a code may include a label specifying "email" or any other type of application. In this embodiment, a different unique code may be obtained for each mobile application. In an alternative implementation, a single unique code may be obtained for all related mobile applications of the mobile device, e.g., all Yahoo! mobile applications. The code may also be associated with a timestamp for use in an expiration process for such code and/or corresponding user credentials as explained further herein. The code itself may not include a timestamp but may be managed by a server or application. For instance, a server (e.g., the credentials management server or a remote application) may manage timeouts for credentials or identifying information. If a mobile application attempts to use credentials or identifying information that are expired, the authentication process may be triggered again.

After a unique code is provided, the mobile device may then display the unique code for the user (e.g., on the mobile device's display) and instruct the user to perform an authentication process using the unique code via an authentication portal in operation 204. For instance, the mobile device may specify a special login web page for providing user credentials for any number of applications. That is, the authentication portal may be a generic login page that is configured to handle user credential entries for a plurality of related applications, such as a service provider's email, personal page, blog, etc. Alternatively, the user may be directed to a link to a specific application's login web page, such as Yahoo! email.

It may then be determined whether the user has completed the authentication process in operation 206. For instance, the user may indicate completion of the authentication process by selecting a "done" option on the mobile device so that the mobile device receives input that confirms that the user has performed the authentication process. Alternatively, the mobile device may poll the credentials management server to determine whether the user has entered the unique code in an authentication process via an authentication portal of the credentials management device. Yet alternatively, the credentials management server may send a message to the mobile device when the user has completed such authentication process.

If the user has not completed such process, it may then be determined whether a timeout for the unique code has occurred in operation 214. If a timeout has occurred, a new unique code may then be generated in operation 202. The credentials server may also be informed of a timeout if the unique code was obtained from such server so that the unique code's timeout on the server can be coordinated with the mobile device's timeout for such unique code. Of course, a timeout determination process is optional and once a unique code is generated, the procedure 200 may continue to wait indefinitely for the user to complete the authentication process. In the illustrated example, when there is no timeout, the procedure 200 continues to wait for the user to complete the authentication process in operation 206.

After completion of the user authentication process, the mobile device may then request the user credentials that are associated with the unique code from the credential management server in operation 208. For instance, the request includes the unique code as a parameter. It may then be determined whether user credentials are received in operation 210. If credentials are not received, it may again be determined whether a timeout has occurred in operation 214. If a timeout occurs, a new code may be obtained. Otherwise, the procedure continues to wait for the user credentials. When the user credentials are received, the user credentials may then be stored for use by the mobile device (e.g., in user credentials storage area 104 of mobile device 102*a*) in operation 212.

The stored user credentials may then be used to perform at the mobile device an authentication process in operation 216. This authentication process may be performed so as to authorize the mobile device to utilize at least a portion of the one or more applications that correspond to the stored user credentials without the user having to input anything into the mobile device. That is, the authentication process is performed at the mobile device without requiring input from the user during such authentication process. The stored user credentials may include a plurality of different sets of user credentials for different applications or a single set of stored user credentials may be applicable to a plurality of mobile applications.

The unique code or user credentials may have been associated with a timestamp for expiration of the user credentials. In this case, the user credentials are stored with the timestamp. After the user credentials expire based on the timestamp, the operations for displaying the unique code and obtaining and storing user credentials may be repeated for the mobile device so that the user repeats the authentication process, e.g., via an authentication portal.

The user credentials may also be associated with security settings that were selected by the user. For instance, the user may have entered a PIN (personal identification number) that is required to be entered prior to performance of the authentication process on the mobile device.

Performance of an authentication process on the mobile device may result in the mobile device being authorized to simply access a session of a selected application so that such session is displayed on the mobile device. For instance, the user may be in the middle of a buying or auction session with an on-line store or the user may be involved in a map session (e.g., driving directions or maps for a specific address have been requested) and wish to continue the session on the mobile device. That is, the user is logged in to the application via another device, such as a laptop or desktop computer, and then wants to continue the session on his mobile device. In this case, the authentication credentials may be in the form of a user identification that is associated with the already in-progress session. A mobile application may then check to see whether a session is already in progress for which a code has been entered and then automatically display such session on the mobile device.

The stored user credentials may be utilized each time a corresponding mobile application requires such user credentials in an authentication process. For instance, each time the user accesses their mobile email application from a mobile device, the user's username and password (or an encrypted token) may automatically be used for logging into the mobile email application from the mobile device. When the stored user credentials for a particular application fail the authentication process (e.g., the user credentials are no longer valid or have been changed by the user), the user may again be requested to perform an authentication process through a particular authentication portal using a unique code.

Figure 3:
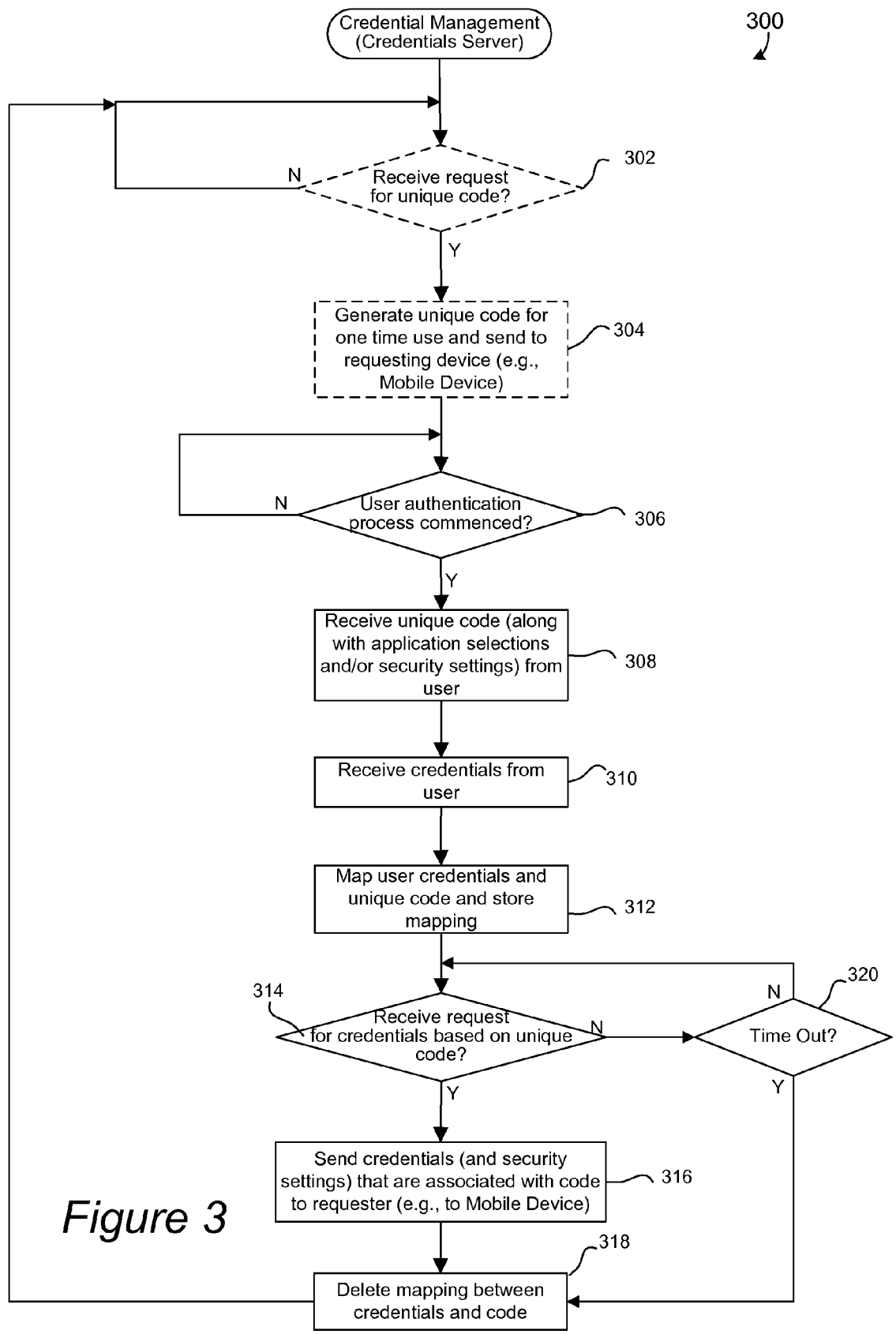
FIG. 3 is a flowchart illustrating a procedure for managing user credentials at a credentials management server in accordance with one implementation of the present invention.

FIG. 3 is a flowchart illustrating a procedure 300 for managing user credentials at a credentials management server in accordance with one implementation of the present invention. In certain implementations, the credentials management server may be responsible for managing unique codes for a plurality of mobile devices. In this case, the following operations are presented with respect to a particular unique code that is generated by the credentials management server. Initially, it may be determined whether a request for a unique code has been received from a mobile device in operation 302. The procedure 300 may continue to wait for a request for a unique code. After a request is received, a unique code for one time use may be generated and sent to the requesting device in operation 304. For example the unique code is sent to the requesting mobile device. If the mobile devices handle their own unique codes, operations 302 and 304 may be omitted.

In either case, it may then be determined whether a user authentication process has commenced in operation 306. For example, a user initiates a login to an authentication portal using a particular unique code. If an authentication process has not commenced, the procedure 300 may continue to wait for an authentication process in operation 306. After an authentication process has commenced for a particular unique code, a unique code may be received from the user in operation 308. One or more application selections and/or security settings may also be received, along with the unique code, in operation 308. User credentials for authorizing the user to access one or more applications are also received from the user in operation 310. User credentials generally are used to authorize use of one or more applications by a user and may include, for example, username, password, credit card or other financial information, tokens designed for remote access, etc. The user credentials and unique code are then mapped and such mapping is stored in operation 312. Security settings and applications selections may be stored and associated with these mappings. A timestamp may also be stored and associated with the user credentials.

The user credentials may include a cryptographic token. For example, after an initial login by a user, during which a user name and password are entered, an encrypted token may be stored as a cookie in the web browser of such user. This token can then be used for subsequent logins by the user. Accordingly, the token may be the only credential needed for a device (e.g., mobile device) to act on the user's behalf. The protocols OAuth (described in the publication by Mark Atwood, entitled "OAuth Core 1.0 Draft 4", OAuth Authorization Workgroup, 3 Oct. 2007) and BBAuth (available from Yahoo! Inc. of Sunnyvale, Calif.) are examples of token-based authentication systems that provide methods for external applications to use tokens as credentials to act on a user's behalf.

Returning to FIG. 3, it may then be determined whether a request for user credentials based on the unique code has been received in operation 314. In other words, if the request includes a unique code that matches the stored mapping's unique code, the user credentials associated with the matching mapping's user credentials are sent to the requesting mobile device. If a request has not been received, it may be determined whether a timeout has occurred (for the particular code) in operation 320. However, this timeout process is optional. If a timeout occurs, the mapping between the credentials and unique code may be deleted in operation 318. Otherwise, when a request is received, the user credentials that are associated with the unique code, along with security settings and timestamp if present, are sent to the requester in operation 316. The mapping between the credentials and code may then be removed or deleted in operation 318.

If the mobile devices provide their own unique codes, then the credentials management server may operate to trigger a mapping process when user credentials and a unique code are received and to trigger a credential sending process when a mobile device requests the user credentials for a matching unique code. That is, when a unique code is received in a user credential request from a mobile device, the mapping database is searched for a matching unique code and any corresponding user credentials are sent back to the requesting mobile device.

Figure 4A:
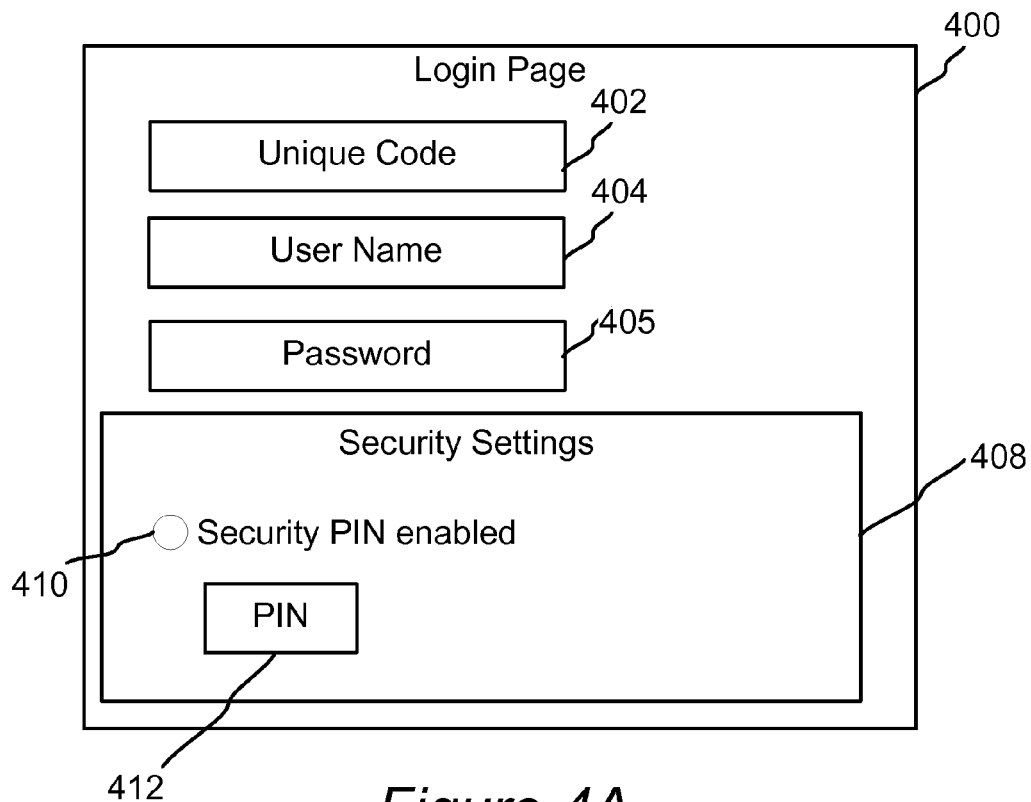
FIGS. 4A and 4B are example user interfaces for credential management in accordance with specific implementations of the present invention.
Figure 4B:
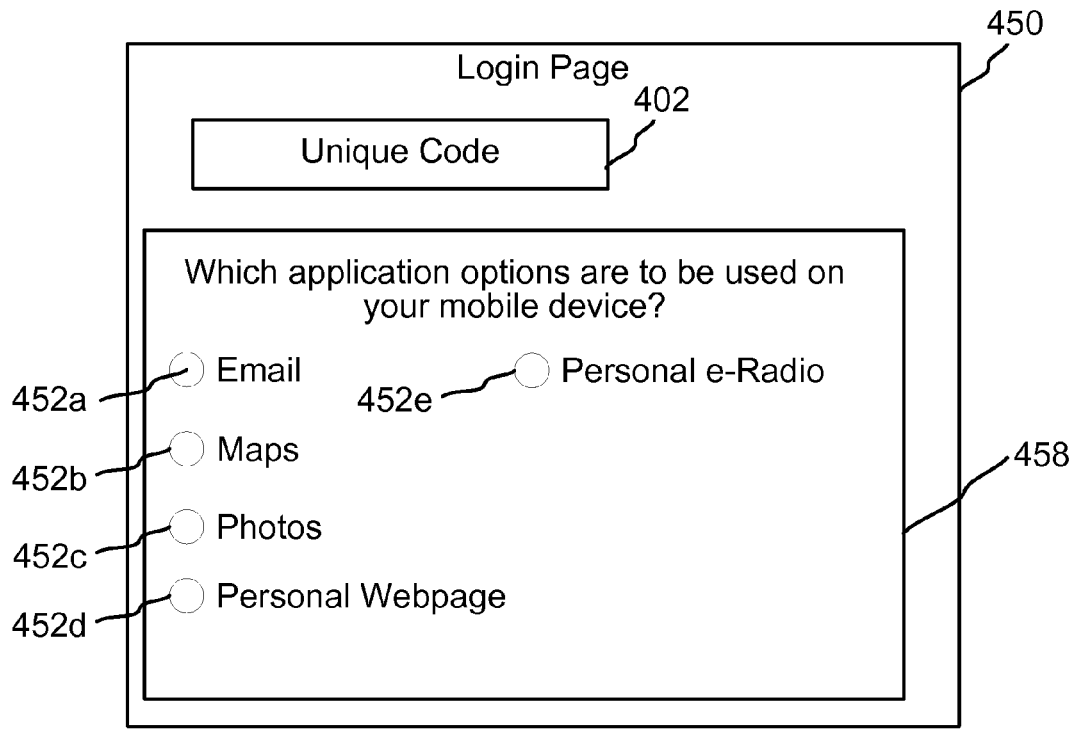

FIGS. 4A and 4B are example user interfaces for credential management in accordance with specific implementations of the present invention. FIG. 4A represents a generic login page 400 for a user to perform an authentication process, for example, from a laptop or desktop computer. Of course, the user may also use their mobile device to perform such process once for their mobile device. As shown, the login page 400 includes input areas for a unique code 402, user name 404, password 405, and security settings 408.

In this embodiment, a single page may be used to enter a single set of user credentials for a plurality of applications. For example, the same Yahoo! username and password is applicable for use with a number of Yahoo! mobile applications. The security setting may include specified access levels to one or more application components or a timeout option. In the illustrated example, the security settings 408 includes an option 410 to select PIN enablement. When the PIN option 410 is checked, the user enters a PIN 412 that is then required to be entered on the mobile device prior to performance of an authentication process utilizing the associated user credentials.

In another implementation, the unique code entered by the user may specify one or more specific application identities for one or more specific applications. In this case, the credentials management server may parse through the code to obtain the specific applications so that user credentials are then only received for these specific applications. For example, the username 404, password 405, and security settings 408 that are entered by the user are associated with the specific applications. In some cases, it may be desirable to allow the user to enter different user credentials for each specific application. In this case, the user is walked through a process for entering the user credentials for each specific application via one or more web pages.

FIG. 4B illustrates an alternative user interface 450 for a user to perform an authentication process for selected applications. As shown, the page 450 includes an input area 452 for receiving a unique code from the user and an application options area 458. In this example, the user may select one of the following application options 452: Email 452a, Maps 452b, Photos 452c, Personal Webpage 452d, and Personal e-Radio 452e. After the user selects specific applications, the user may then be walked through a process for entering user credentials (username, password, and security settings) for each specified application so that the credentials management server only receives credentials for each the selected specified applications. Additionally, dependent on the application the user is authorizing access to, it is possible for the user to grant privileges (and corresponding credentials) to only some features of the application. For example, a user may grant access only to a mobile photos application to view/retrieve photos, but not to delete existing photos or add new photos. Or a user may grant a mobile application access read, but not modify existing documents.

Embodiments of the present invention allow a user to utilize applications with their mobile device with minimal input during any authentication process. In one example, the user may only have to enter a PIN to initiate automatic use of previously stored user credentials, such as username, password, or financial information. In another example, the user credentials are automatically used for each corresponding mobile application when needed for an authentication process without requiring input by the user during such authentication process.

In alternative uses, the device would not have any input mechanisms, such as buttons, for the user to indicate that code has been used for authentication. The unique code may be displayed and the user authenticates on another input-capable device. The original device that displayed the code checks periodically whether there is a match between the code and user credentials. When a match is found, the matching user credentials are then automatically associated with the specific application without the user indicating with the original device that he/she has entered user credentials. In a specific application, a television may be operating in a public venue and display a code to the audience. An audience member may then enter the displayed code and his specific user credentials from a laptop or other device. The particular audience member can then be associated with that specific television for various purposes.

Figure 5:
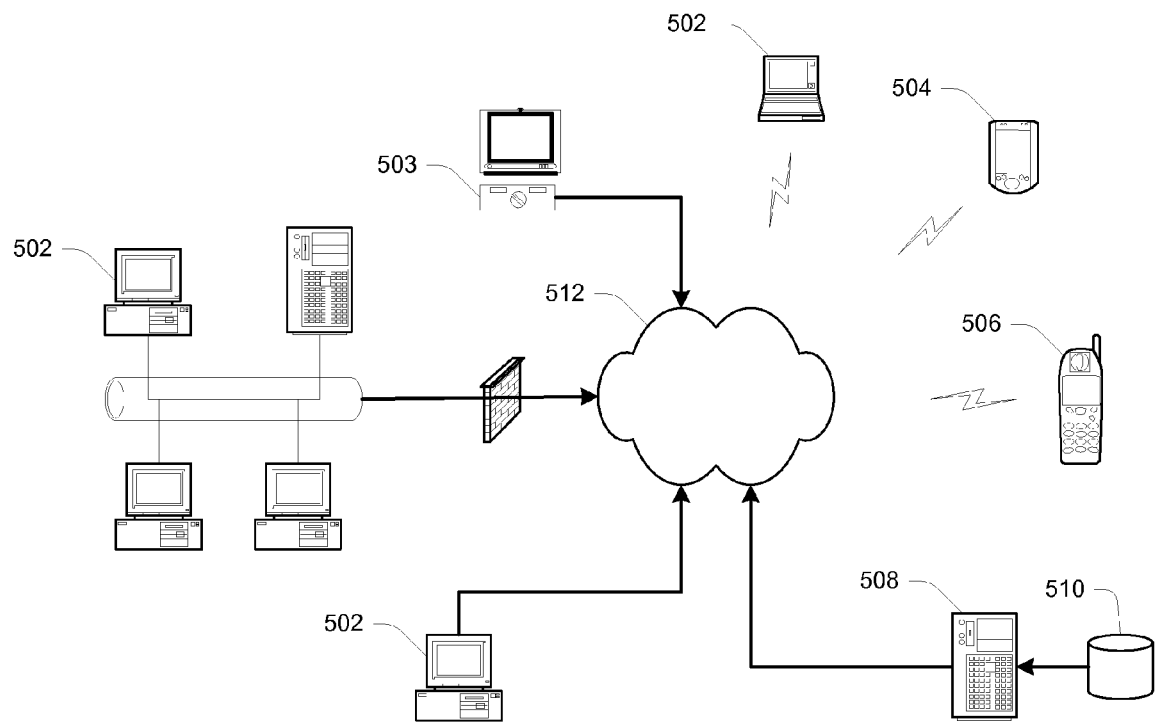
FIG. 5 is a simplified diagram of a network environment in which specific embodiments of the present invention may be implemented.

Embodiments of the present invention may be employed to manage user credentials in any of a wide variety of computing contexts. For example, as illustrated in FIG. 5, implementations are contemplated in which the relevant population of users interact with a diverse network environment via any type of computer (e.g., desktop, laptop, tablet, etc.) 502, media computing platforms 503 (e.g., cable and satellite set top boxes and digital video recorders), handheld computing devices (e.g., PDAs) 504, cell phones 406, or any other type of computing or communication platform.

And according to various embodiments, codes and their associated user credentials that are processed in accordance with the invention may be obtained using a wide variety of techniques. For example, associations representing a user's interaction with a local application, web site or web-based application or service (e.g., associations between codes and their associated user credentials) may be accomplished using any of a variety of well known mechanisms for recording a user's behavior. However, it should be understood that such methods of obtaining user credentials are merely exemplary and that credentials may be collected in many other ways.

Credential management may be handled according to the invention in some centralized manner. This is represented in FIG. 5 by server 508 and data store 510 that, as will be understood, may correspond to multiple distributed devices and data stores. The invention may also be practiced in a wide variety of network environments (represented by network 512) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Figure 6:
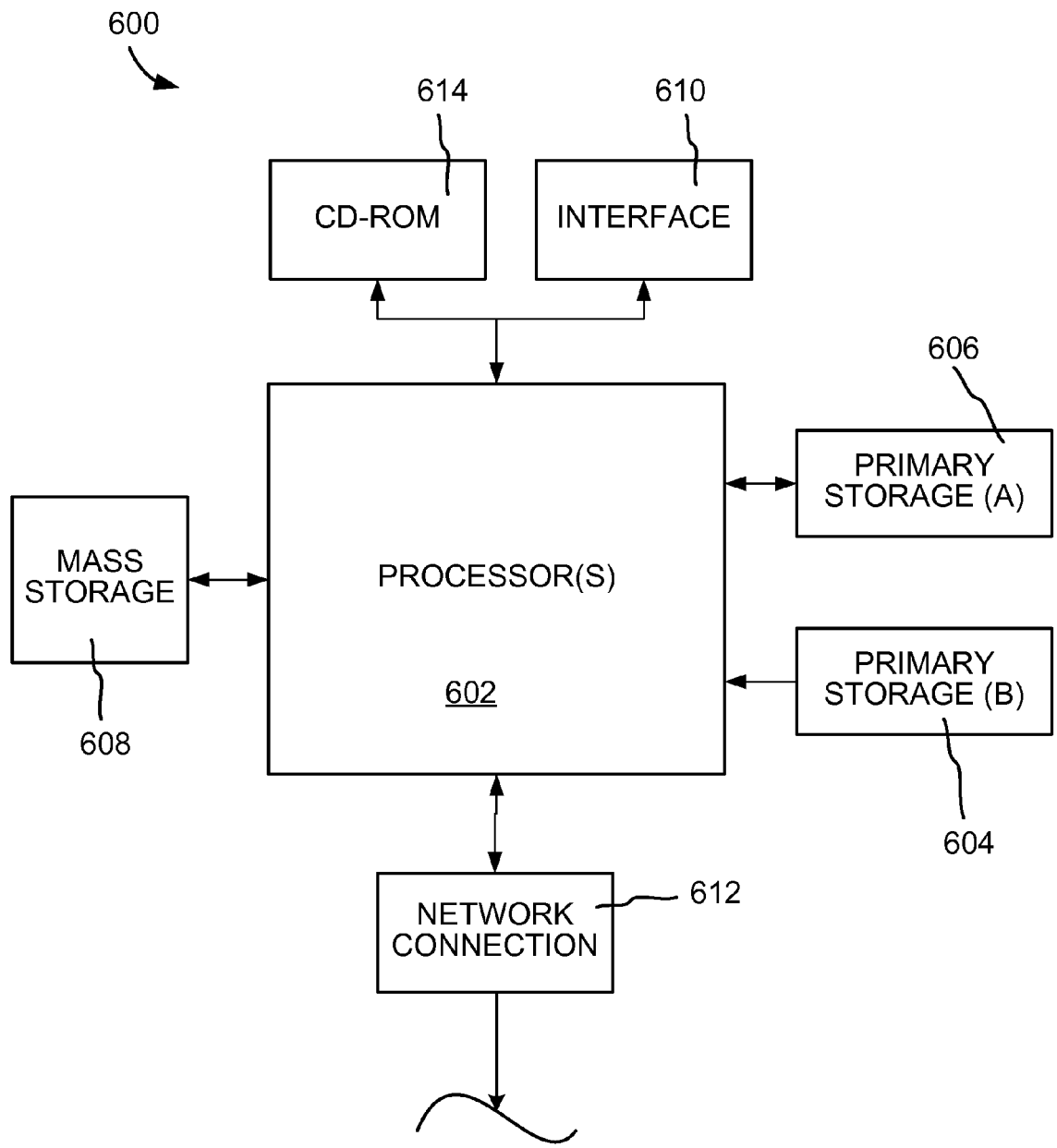
FIG. 6 illustrates a typical computer system that, when appropriately configured or designed, can serve as a system of this invention.

FIG. 6 illustrates a typical computer system that, when appropriately configured or designed, can serve as a system (e.g., user credential management, mobile application handling, authentication portal) of this invention. The computer system 600 includes any number of processors 602 (also referred to as central processing units, or CPUs) that are coupled to storage devices including primary storage 606 (typically a random access memory, or RAM), primary storage 604 (typically a read only memory, or ROM). CPU 602 may be of various types including microcontrollers and microprocessors such as programmable devices (e.g., CPLDs and FPGAs) and unprogrammable devices such as gate array ASICs or general purpose microprocessors. As is well known in the art, primary storage 604 acts to transfer data and instructions uni-directionally to the CPU and primary storage 606 is used typically to transfer data and instructions in a bi-directional manner. Both of these primary storage devices may include any suitable computer-readable media such as those described herein. A mass storage device 608 is also coupled bi-directionally to CPU 602 and provides additional data storage capacity and may include any of the computer-readable media described above. Mass storage device 608 may be used to store programs, data and the like and is typically a secondary storage medium such as a hard disk. It will be appreciated that the information retained within the mass storage device 608, may, in appropriate cases, be incorporated in standard fashion as part of primary storage 606 as virtual memory. A specific mass storage device such as a CD-ROM 614 may also pass data uni-directionally to the CPU.

CPU 602 is also coupled to an interface 610 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 602 optionally may be coupled to an external device such as a database or a computer or telecommunications network using an external connection as shown generally at 612. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store user credentials, unique codes, mappings between user credentials and unique codes, security settings, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as air, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method of associating a mobile device with a web service or a user account, comprising:
    displaying on a display of a mobile device a unique code, which is associated with a user account or web service to be utilized via the mobile device, and displaying on the display of the mobile device instructions for a user to enter the unique code and user credentials for logging into the user account or web service in an authentication process via an authentication portal of a management device;
    after it is determined that the authentication process has been performed, obtaining from the management device the user credentials associated with the unique code and storing the user credentials for use by the mobile device; and
    after the user credentials have been obtained and stored and each time the user account or web service is being accessed by the user via the mobile device, automatically using the stored user credentials during an authentication process to log the user into the user account or web service from the mobile device without requiring the user to input the user credentials into the mobile device during such authentication process.

2. A method as recited in claim 1, further comprising generating the unique code based on an identity associated with the mobile device.

3. A method as recited in claim 1, wherein automatically using the stored user credentials to log the user into the user account or web service comprises authorizing the user to access a session of the web service so that such session is displayed on the mobile device, wherein the session was initiated by the user from another device.

4. A method as recited in claim 1, wherein the unique code is associated with a timestamp for the user credentials to expire, the method further comprising:
    after the user credentials expire based on the timestamp, repeating the operations for displaying a unique code, obtaining and storing user credentials, and using user credentials.

5. A method as recited in claim 1, wherein the stored user credentials include one or more security settings, wherein the security settings indicate an access level or time to expire for the user credentials.

6. A method as recited in claim 1, wherein the user credentials and the unique code were entered by the user from another computer device.

7. A method as recited in claim 1, wherein it is determined whether the authentication process has been performed by polling the management device to determine whether the unique code has been entered in an authentication process via an authentication portal of the management device.

8. A method as recited in claim 1, further comprising obtaining, at the mobile device, the unique code from the management device.

9. A mobile device for associating a mobile device with a web service or a user account, comprising:
    at least one a processor; and
    at least one memory, the at least one processor and/or memory being configured for:
        displaying on the mobile device a unique code, which is associated with a user account or web service to be utilized with the mobile device, and displaying on the mobile device instructions for a user to enter the unique code and user credentials for logging into the user account or web service in an authentication process via an authentication portal of a management device;
        after it is determined that the authentication process has been performed, obtaining from the management device the user credentials associated with the unique code and storing the user credentials for use by the mobile device; and
        after the user credentials have been obtained and stored and each time the user account or web service is being accessed by the user via the mobile device, automatically using the stored user credentials during an authentication process to log the user into the user account or web service from the mobile device without requiring the user to input the user credentials into the mobile device during such authentication process.

10. A mobile device as recited in claim 9, the at least one processor and/or memory being further configured for generating the unique code based on an identity associated with the mobile device.

11. A mobile device as recited in claim 9, wherein automatically using the stored user credentials to log the user into the user account or web service comprises authorizing the user to access a session of the web service so that such session is displayed on the mobile device, wherein the session was initiated by the user from another device.

12. A mobile device as recited in claim 9, wherein the unique code is associated with a timestamp for the user credentials to expire, the at least one processor and/or memory being further configured for:
    after the user credentials expire based on the timestamp, repeating the operations for displaying a unique code, obtaining and storing user credentials, and using user credentials.

13. A mobile device as recited in claim 9, wherein the stored user credentials include one or more security settings, wherein the security settings indicate an access level or time to expire for the user credentials.

14. A mobile device as recited in claim 9, wherein the user credentials and the unique code were entered by the user from another computer device.

15. A mobile device as recited in claim 9, wherein it is determined whether the authentication process has been performed by polling the management device to determine whether the unique code has been entered in an authentication process via an authentication portal of the management device.

16. A mobile device as recited in claim 9, the at least one processor and/or memory being further configured for obtaining, at the mobile device, the unique code from the management device.

17. At least one computer readable storage medium having computer program instructions stored thereon that are arranged to perform the following operations:
    displaying on a display of a mobile device a unique code, which is associated with a user account or web service to be utilized via the mobile device, and displaying on the display of the mobile device instructions for a user to enter the unique code and user credentials for logging into the user account or web service in an authentication process via an authentication portal of a management device;

after it is determined that the authentication process has been performed, obtaining from the management device the user credentials associated with the unique code and storing the user credentials for use by the mobile device; and after the user credentials have been obtained and stored and each time the user account or web service is being accessed by the user via the mobile device, automatically using the stored user credentials during an authentication process to log the user into the user account or web service from the mobile device without requiring the user to input the user credentials into the mobile device during such authentication process.

18. At least one computer readable storage medium as recited in claim 17, wherein the computer program instructions are arranged to generate the unique code based on an identity associated with the mobile device.

19. At least one computer readable storage medium as recited in claim 17, wherein automatically using the stored user credentials to log the user into the user account or web service comprises authorizing the user to access a session of the web service so that such session is displayed on the mobile device, wherein the session was initiated by the user from another device.

20. At least one computer readable storage medium as recited in claim 11, wherein the unique code is associated with a timestamp for the user credentials to expire, wherein the computer program instructions are arranged to:

after the user credentials expire based on the timestamp, repeating the operations for displaying a unique code, obtaining and storing user credentials, and using user credentials.

21. At least one computer readable storage medium as recited in claim 17, wherein the stored user credentials include one or more security settings, wherein the security settings indicate an access level or time to expire for the user credentials.

22. At least one computer readable storage medium as recited in claim 17, wherein the user credentials and the unique code were entered by the user from another computer device.

23. At least one computer readable storage medium as recited in claim 17, wherein it is determined whether the authentication process has been performed by polling the management device to determine whether the unique code has been entered in an authentication process via an authentication portal of the management device.

24. At least one computer readable storage medium as recited in claim 17, wherein the computer program instructions are further arranged to obtain, at the mobile device, the unique code from the management device.

* * * * *